(12) United States Patent
Jeong

(10) Patent No.: US 10,974,633 B2
(45) Date of Patent: Apr. 13, 2021

(54) HEADREST MOVING DEVICE

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 0 days.

(21) Appl. No.: 16/336,991

(22) PCT Filed: Oct. 24, 2017

(86) PCT No.: PCT/KR2017/011769
§ 371 (c)(1),
(2) Date: Mar. 27, 2019

(87) PCT Pub. No.: WO2018/080136
PCT Pub. Date: May 3, 2018

(65) Prior Publication Data
US 2020/0031263 A1    Jan. 30, 2020

(30) Foreign Application Priority Data

Oct. 28, 2016  (KR) ........................ 10-2016-0141993

(51) Int. Cl.
*B60N 2/847*      (2018.01)
*B60N 2/856*      (2018.01)
(Continued)

(52) U.S. Cl.
CPC ............... *B60N 2/847* (2018.02); *A47C 7/38* (2013.01); *B60N 2/844* (2018.02); *B60N 2/853* (2018.02); *B60N 2/856* (2018.02)

(58) Field of Classification Search
CPC ........ B60N 2/847; B60N 2/856; B60N 2/841; B60N 2/838; B60N 2/853
See application file for complete search history.

(56) References Cited

U.S. PATENT DOCUMENTS

| 8,857,910 B2 | 10/2014 | Jeong |
| 9,050,917 B2 | 6/2015 | Tobata et al. |
| 2011/0254339 A1 * | 10/2011 | Bruck .................... B60N 2/844 297/403 |

FOREIGN PATENT DOCUMENTS

| CN | 204956198 U | 1/2016 |
| EP | 2777984 A1 * | 9/2014 ............. B60N 2/876 |

(Continued)

OTHER PUBLICATIONS

Korean Intellectual Property Office, International Search Report and Written Opinion of the International Searching Authority, Application No. PCT/KR2017/011769, dated Feb. 21, 2018, 12 pages.

(Continued)

*Primary Examiner* — Timothy J Brindley
(74) *Attorney, Agent, or Firm* — Sunstein LLP

(57) ABSTRACT

The present invention relates to a headrest moving device, more particularly, relates to a headrest moving device comprising: a moving member rotatably connected to a second member; and a guide member connected to the first member and guided by the first member and having a locking groove formed therein for guiding the moving member so that the number of parts of the device is significantly reduced, the weight of the apparatus can be reduced, the manufacturing cost of the apparatus can be reduced, the structure of the apparatus can be simplified since the button can be omitted, and the convenience of usage is enhanced since if a user presses one time, the headrest is positioned in a first position and if presses one more time in the same way the headrest is positioned in a second position.

10 Claims, 14 Drawing Sheets

(51) Int. Cl.
*B60N 2/844* (2018.01)
*B60N 2/853* (2018.01)
*A47C 7/38* (2006.01)

(56) References Cited

FOREIGN PATENT DOCUMENTS

| | | |
|---|---|---|
| JP | 2000217659 A | 8/2000 |
| JP | 2013-154798 A | 8/2013 |
| KR | 20-0238111 Y1 | 11/2001 |
| KR | 10-0359761 B1 | 11/2002 |
| KR | 10-1002730 B1 | 12/2010 |
| KR | 10-1071580 B1 | 10/2011 |
| KR | 10-1327394 B1 | 11/2013 |

OTHER PUBLICATIONS

Chinese Patent Office, Office Action (*with English translation*), 13 pages, dated Nov. 27, 2020.

* cited by examiner

[Fig. 1]
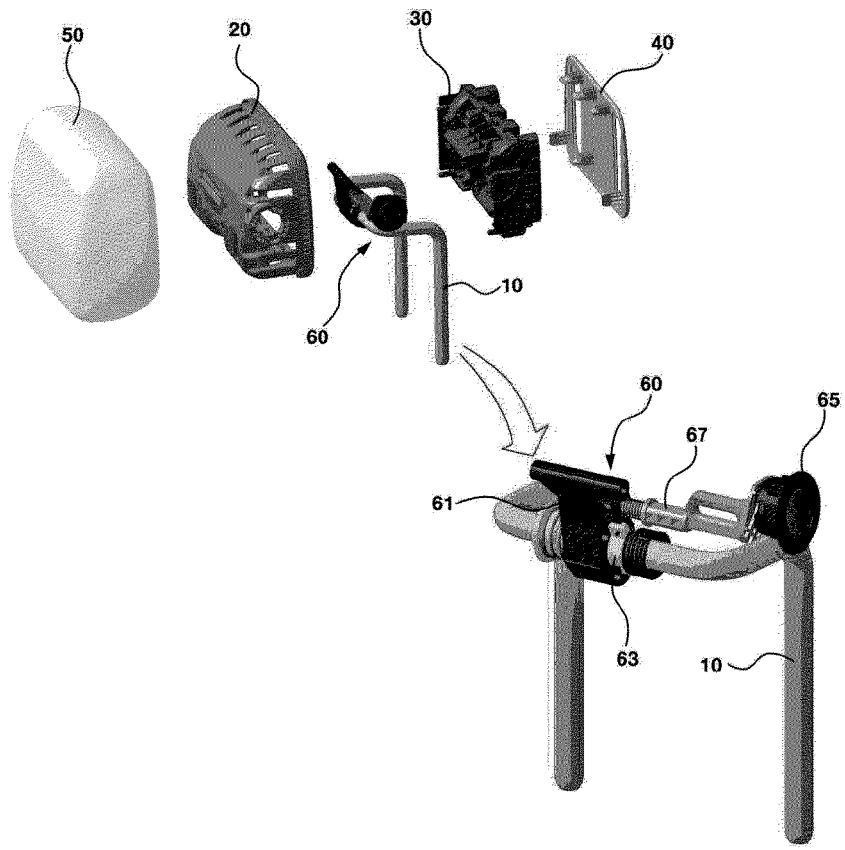
[Fig. 2]
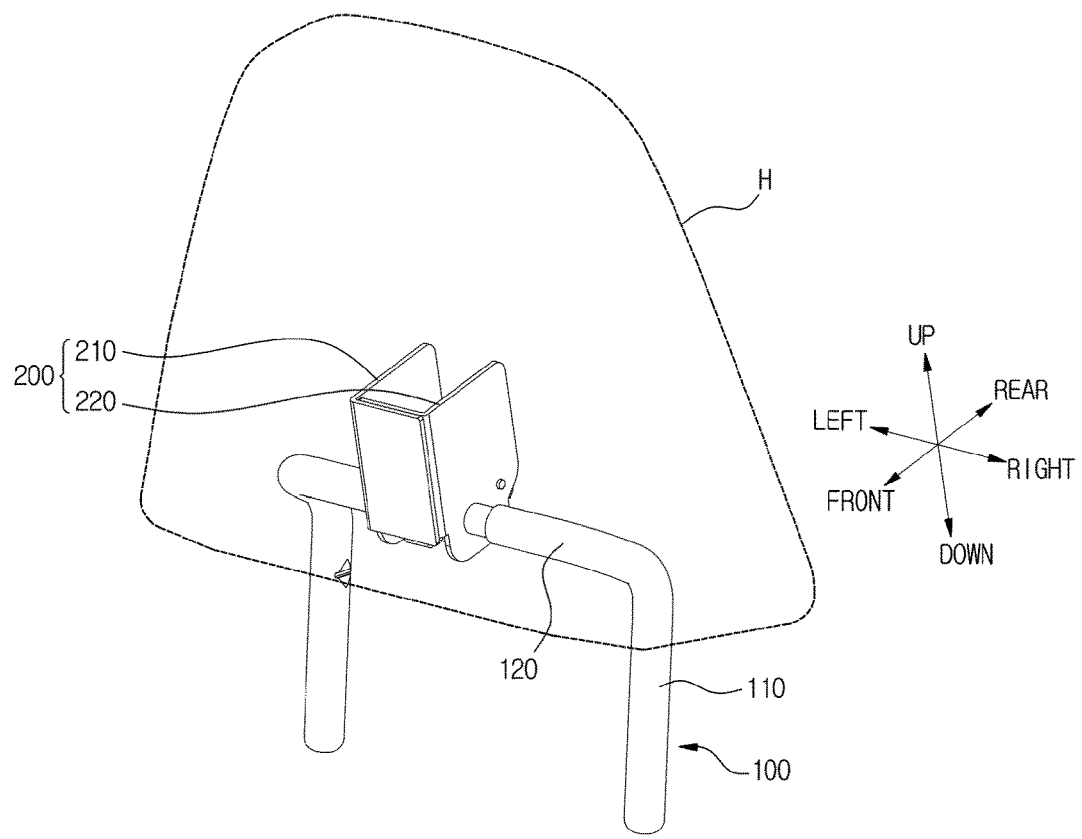

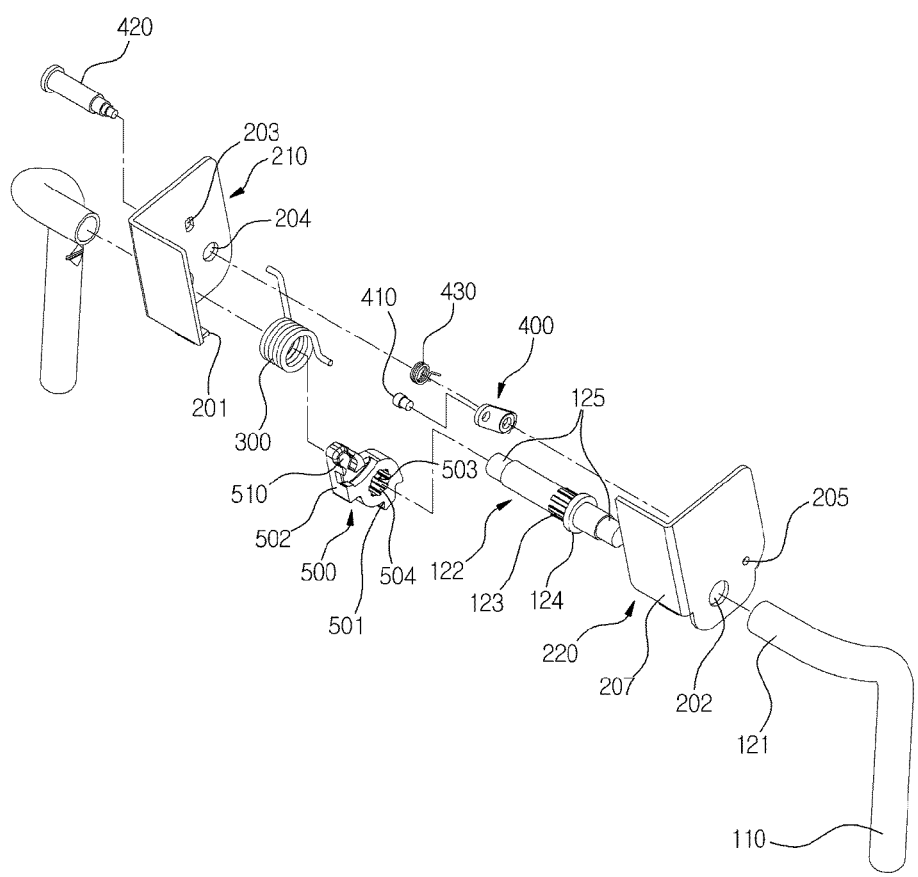
[Fig. 3]

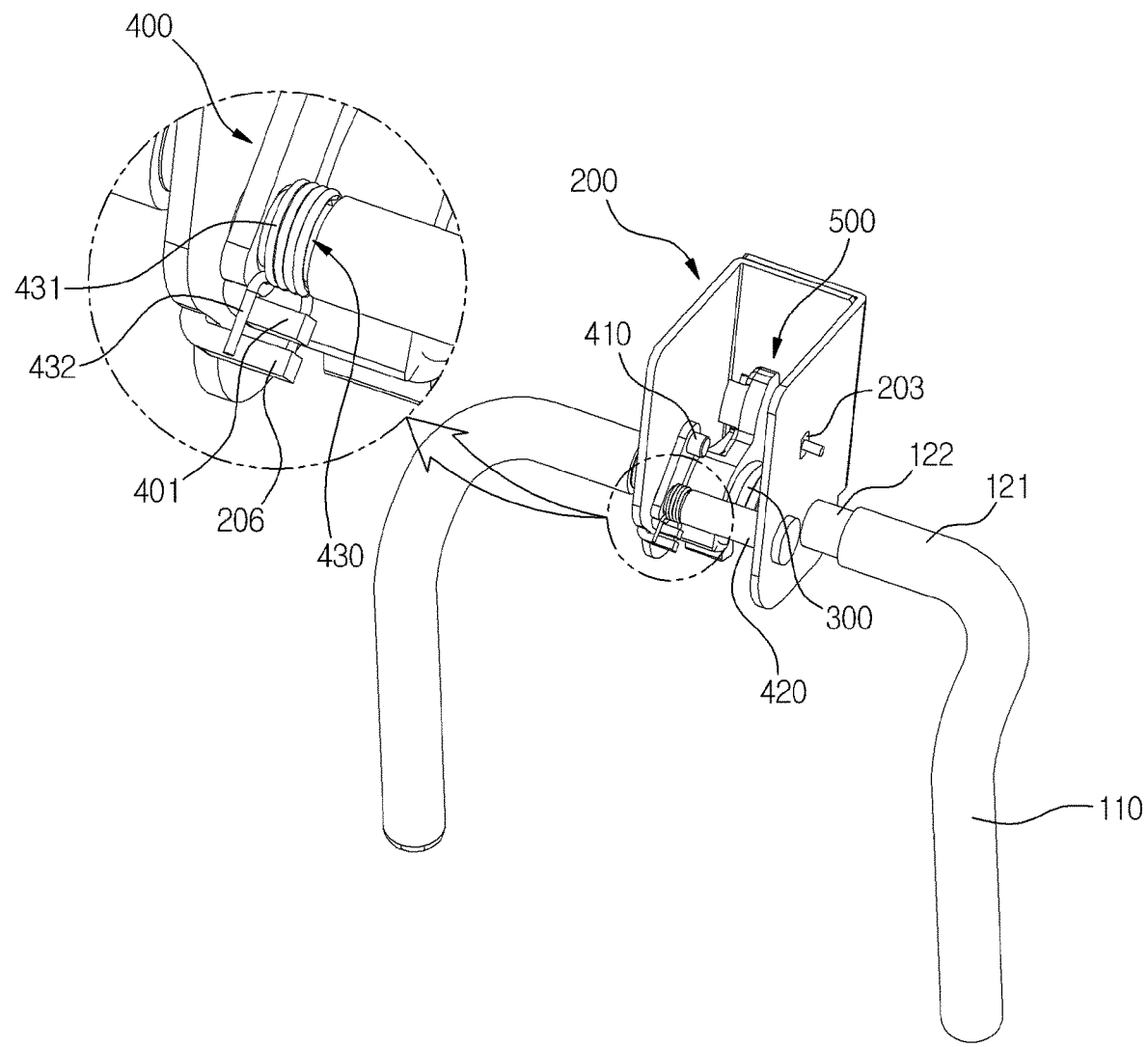

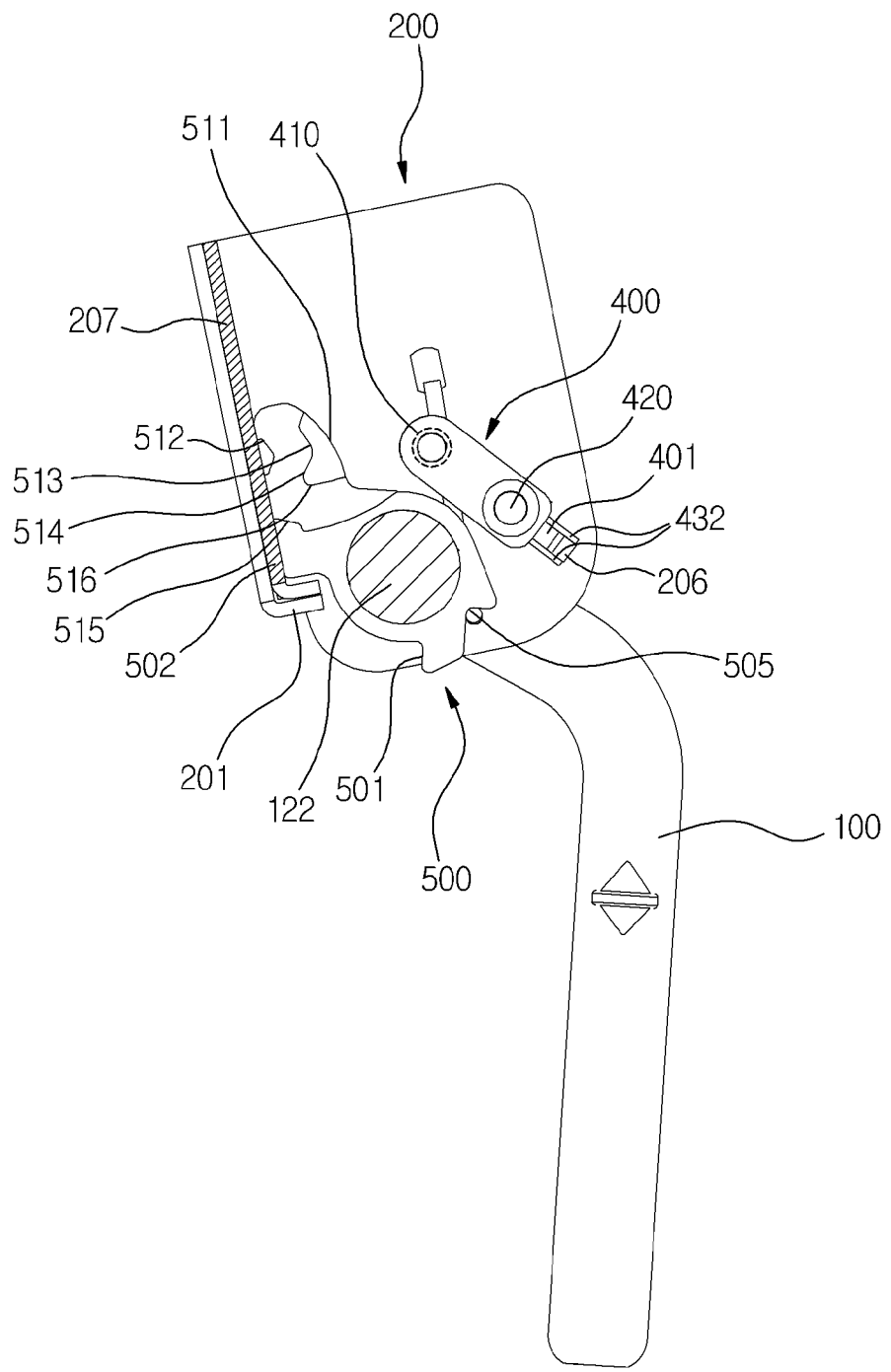
[Fig. 5]

[Fig. 6]
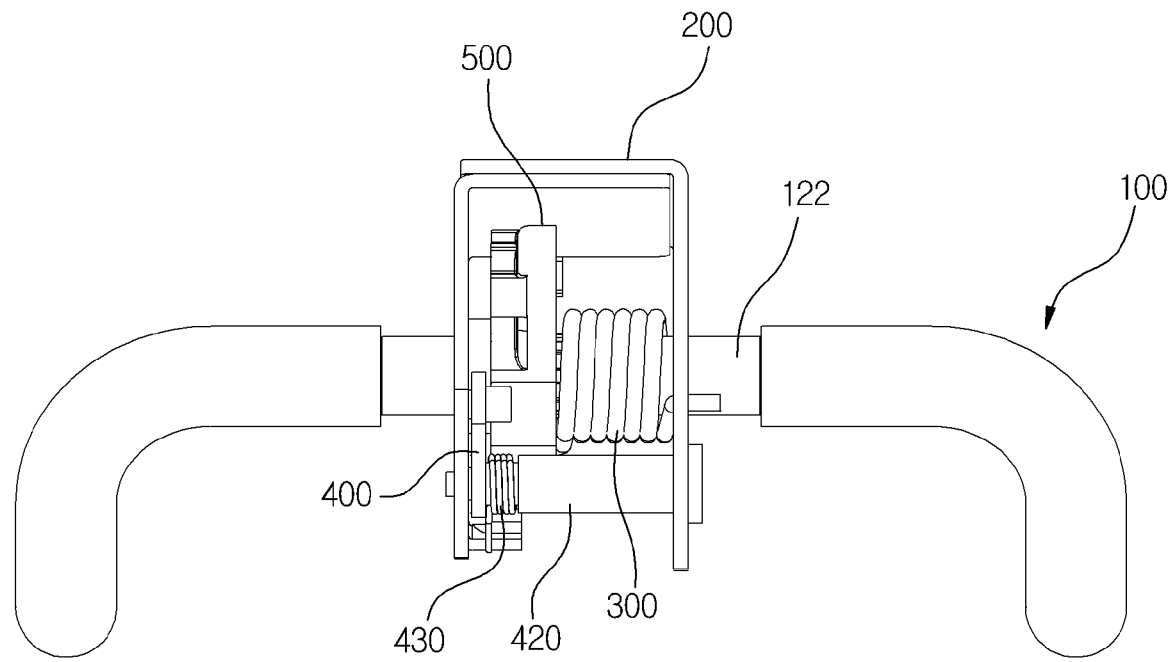
[Fig. 7]
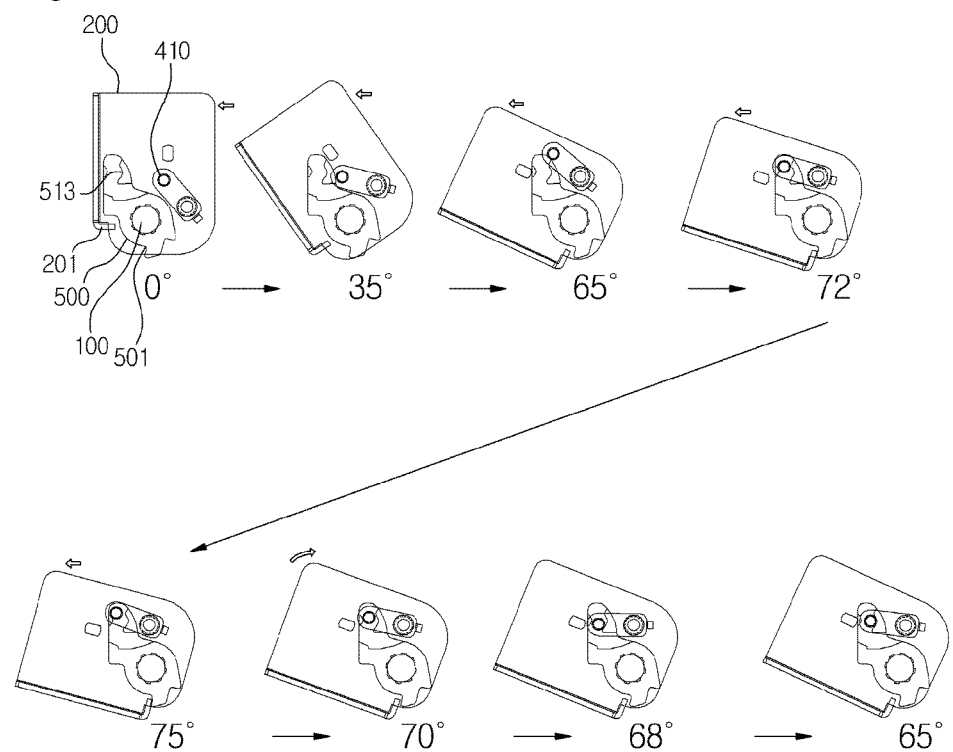

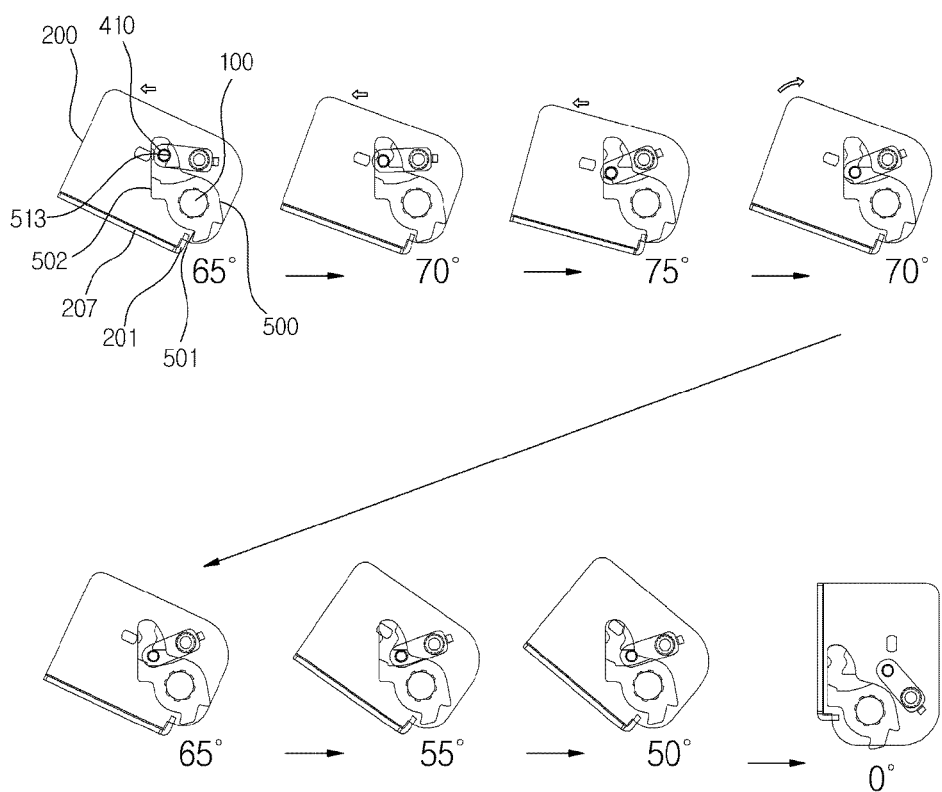

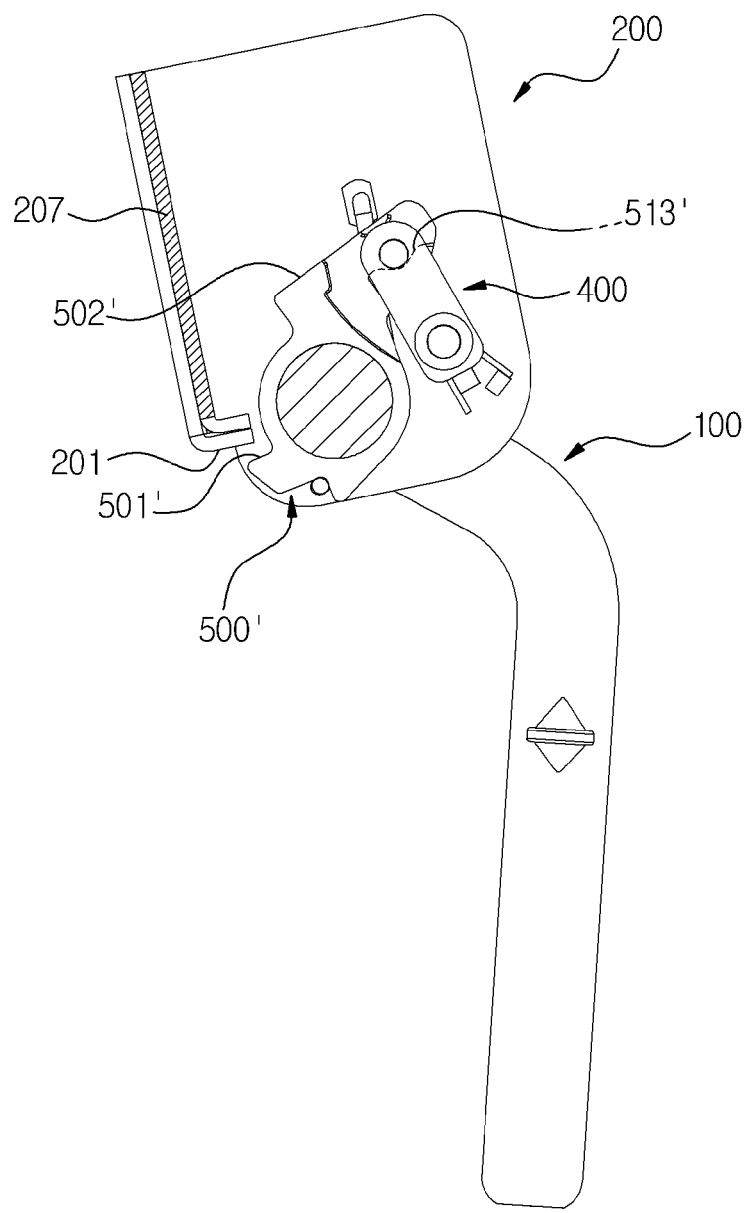
[Fig. 9]

[Fig. 10]
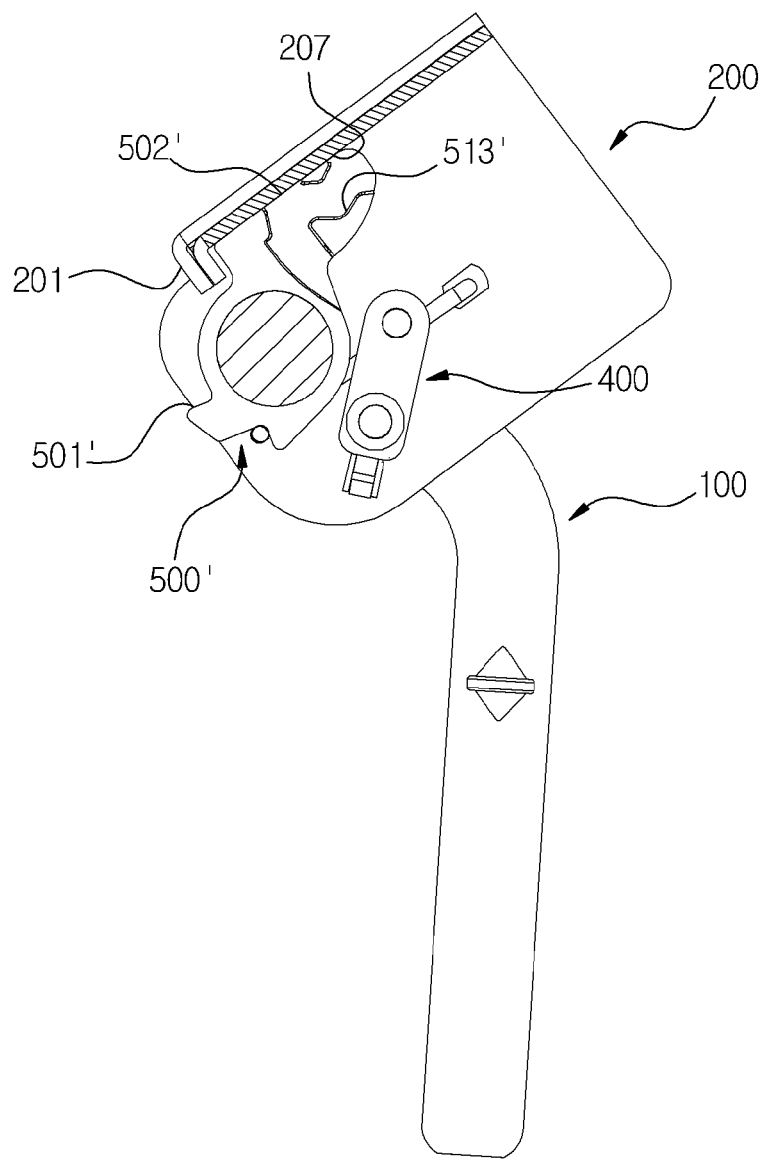

[Fig. 11]
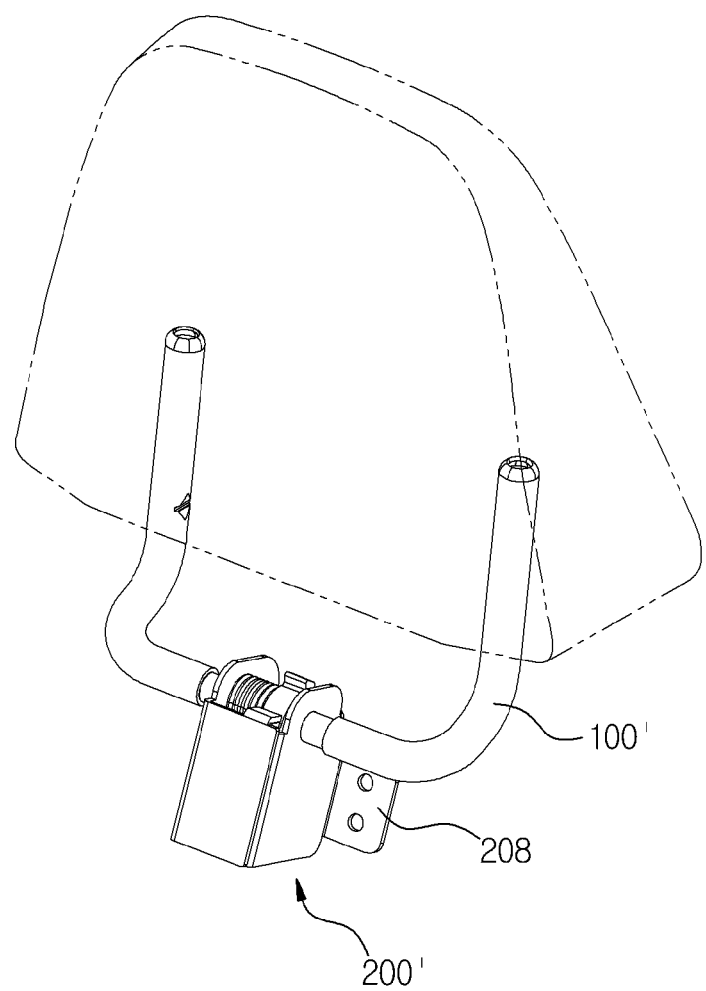

[Fig. 12]
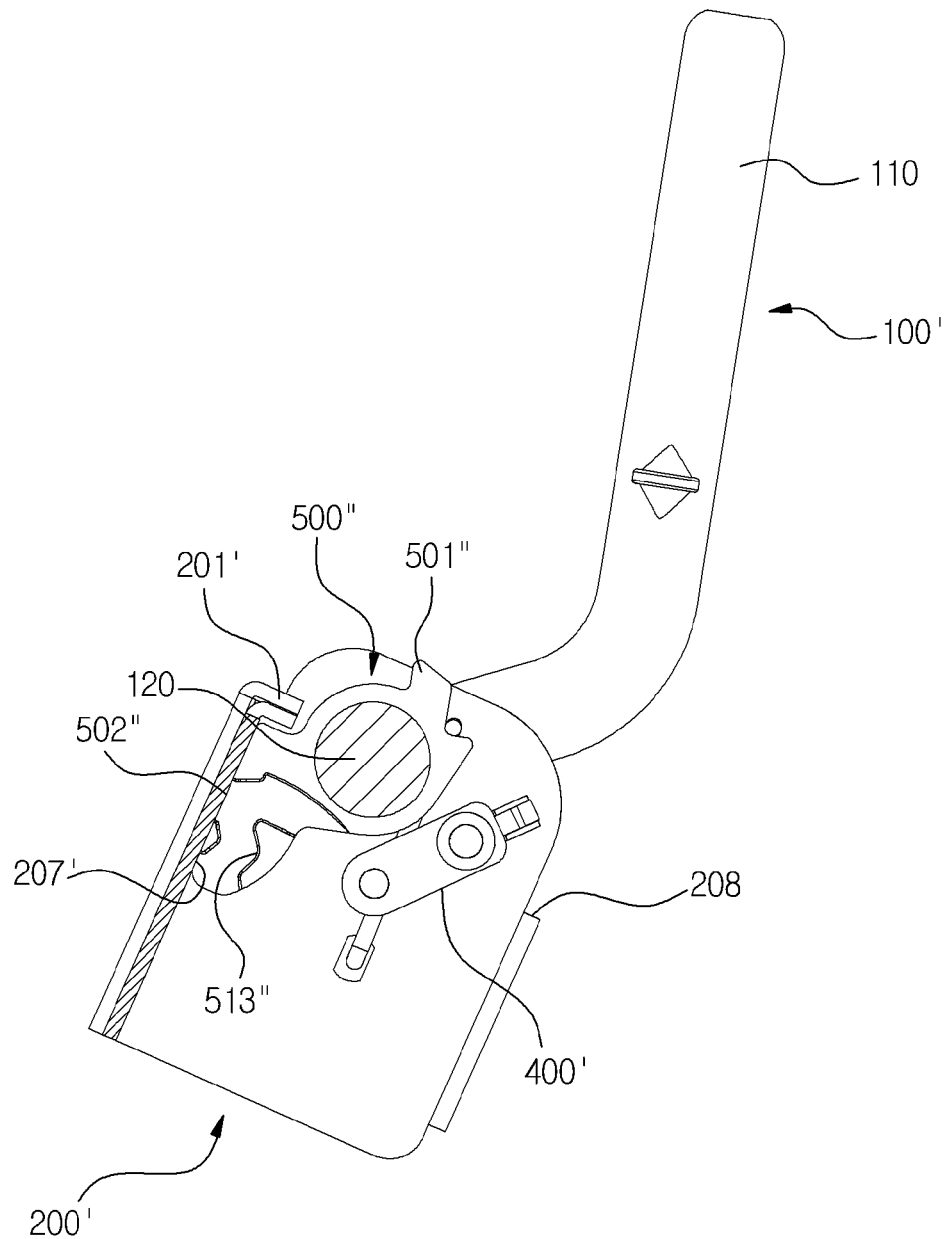

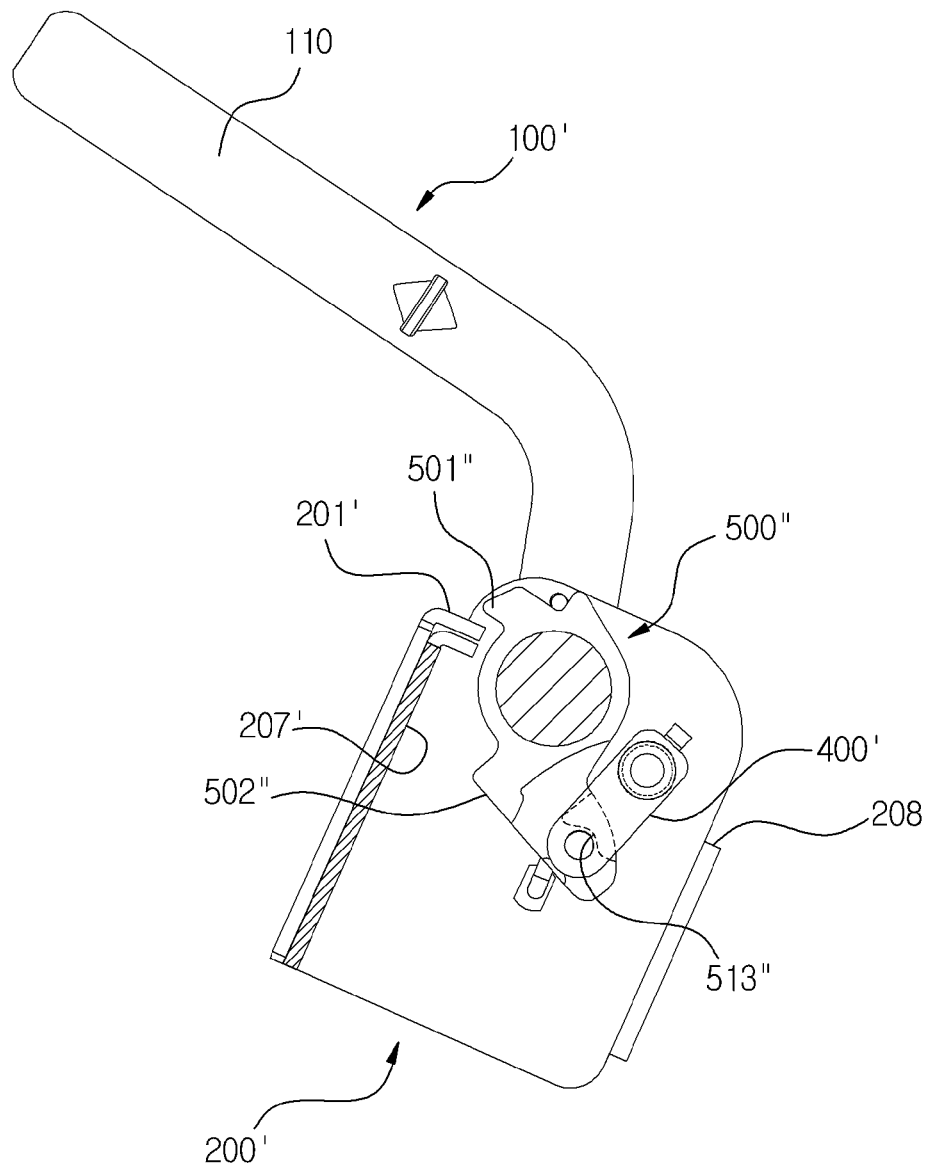
[Fig. 13]

[Fig. 14]
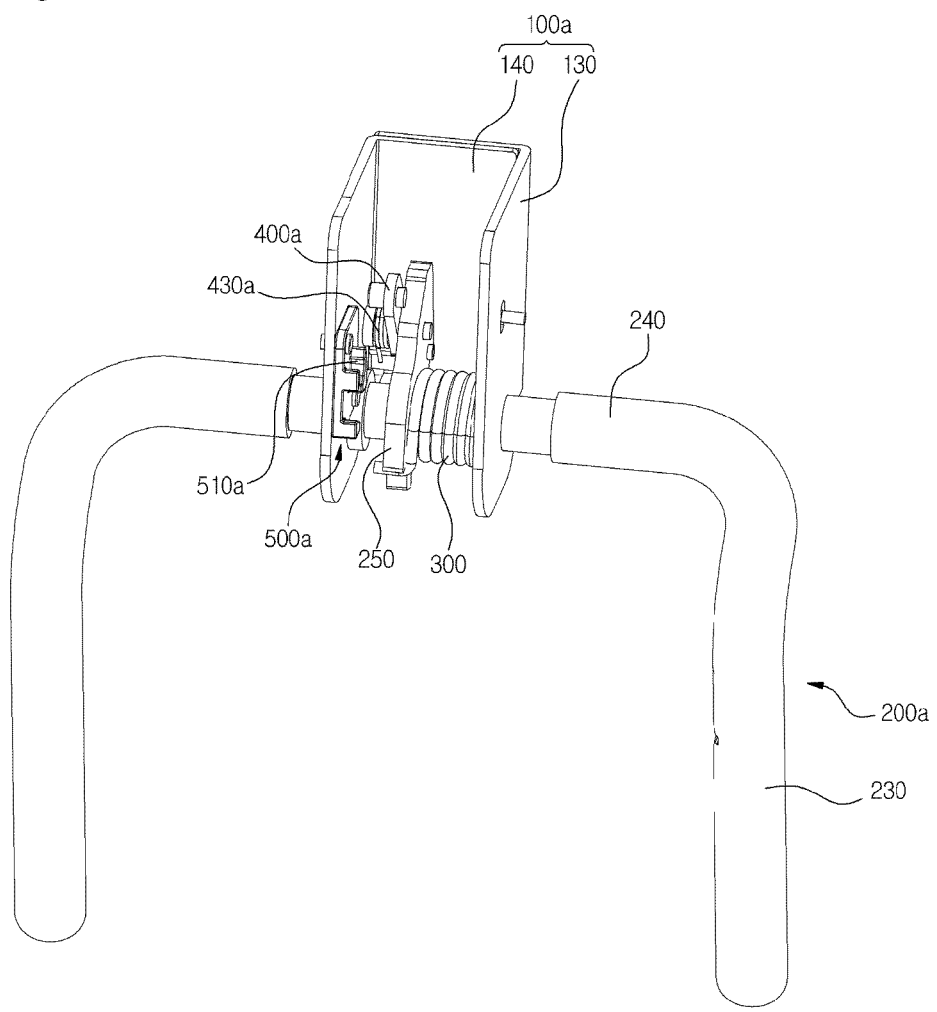

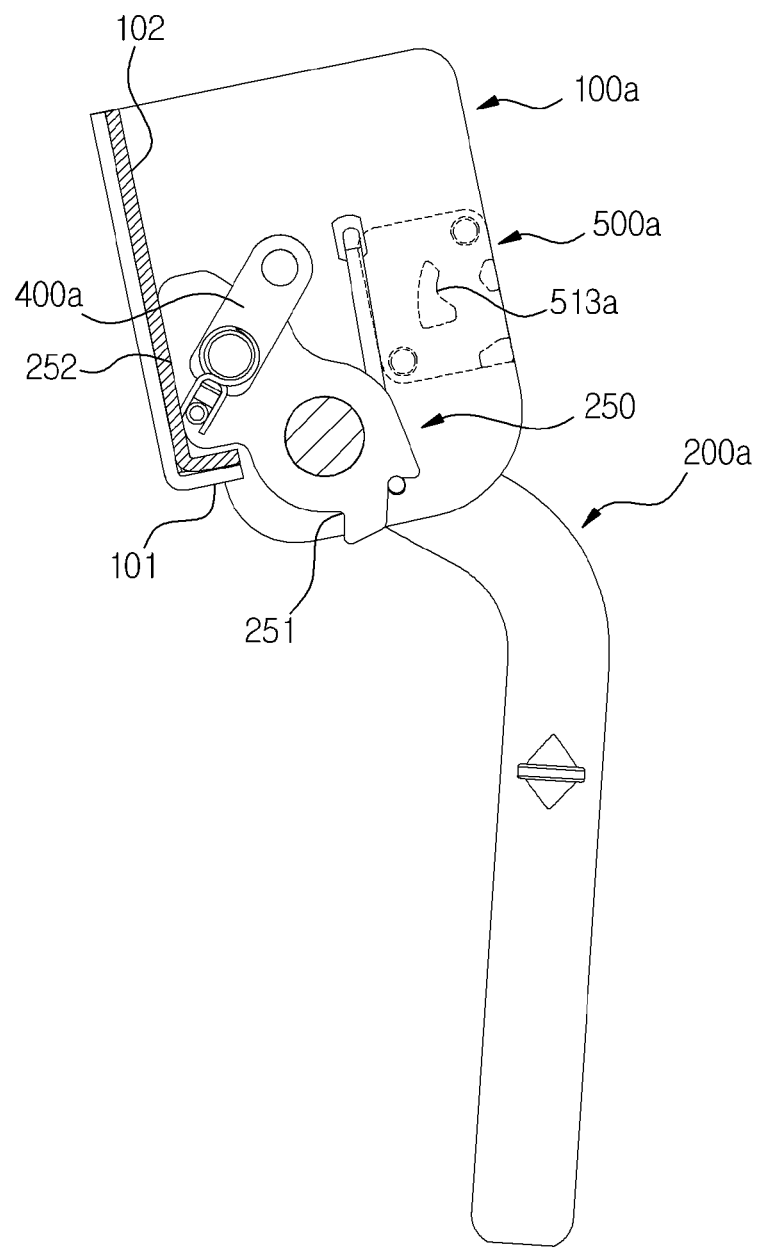

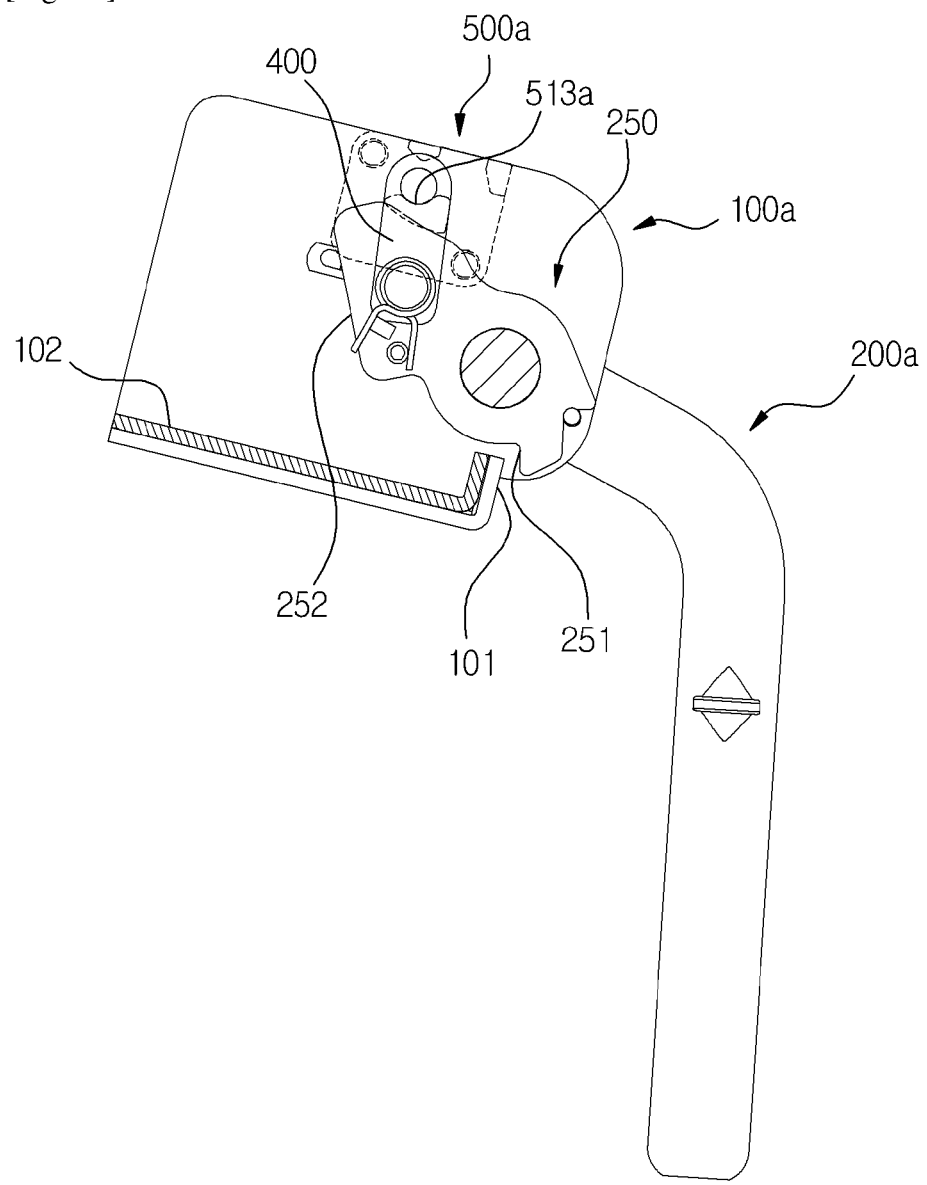
[Fig. 16]

HEADREST MOVING DEVICE

TECHNICAL FIELD

The present invention relates to a headrest moving device, more particularly, relates to a headrest moving device comprising a moving member rotatably connected to a second member, and a guide member connected to a first member for guiding the moving member and formed with a locking groove wherein the moving member is stopped.

BACKGROUND ART

A headrest folding device of the prior art, as illustrated in FIG. 1, comprises: a folding frame 10 formed in the shape of a pole in the upper side of a seat so as to be pulled out, the folding member 10 mounted with a folding means 60 at the end thereof; a front housing 20 and a rear housing 30 mutually coupled to each other and protecting the folding means 60 of the folding frame 10; a rear cover 40 covering the rear-side of the rear housing 30; and a pad 50 provided in the outer side surface of the front housing 20 and supporting the back of the passenger's head.

At this time, the folding means 60 is provided with: a cam bracket 61 rotatably and asymmetrically provided in the upper center of the folding frame 10; and a fixed bracket 63 for fixing the cam bracket 61, and comprises: a manipulating button 65 being exposed towards the outside of the front housing 20 and manipulating the fixing bracket 63; and a shift 67 for releasing the fixing of the cam bracket 61 by the operation of the manipulating button 65.

The headrest folding device of the prior art has the manipulating button 65 to release the fixing of the cam bracket 61, thus, the number of components is increased so that the weight is increased, and since the manipulating button 65 should be exposed towards the outside of the headrest, there are problems in that the manufacturing process becomes complex and the manufacturing cost also increases.

LEADING TECHNICAL LITERATURES

Patent Literature

[Patent Literature 1] Korea Registered Patent No. 1327394

DISCLOSURE OF INVENTION

Technical Problem

An objective of the present invention devised for solving the above described problems is to provide a headrest moving device capable of enhancing the convenience of usage, and at the same time, reducing the number of components and simplifying the structure thereof.

Solution to Problem

To achieve above described objective, a headrest moving device of the present invention comprises: a first member; a second member capable of rotating or sliding with respect to the first member; a return spring for returning the second member with respect to the first member; a moving member rotatably connected to the second member; and a guide member connected to the first member for guiding the moving member and formed with a locking groove wherein the moving member is stopped.

A first portion and a second portion are formed in the first member or a member being fixed to the first member, and a first stopping portion wherein the first portion is being stopped and a second stopping portion wherein the second portion is being stopped may be formed in the second member or a member being fixed to the second member.

At least one of the first portion and the second portion may be formed in the guide member.

The pathway of the moving member may be the shape of a closed curve.

A moving member spring for returning the moving member may further be provided.

The moving member and the second member may be disposed between the both ends of the moving member spring.

The moving member spring may apply an elastic force along the direction opposite to the direction along which the moving member is rotating with respect to the second member.

The second member can be rotated with respect to the first member, a rod inserting hole wherein a rod is inserted is formed in the guide member, a groove is formed in the guide member so as to be disposed inside the rod inserting hole along the lengthwise direction of the rod, and a protrusion to be inserted into the groove may be formed in the outer circumferential surface of the rod.

A flange disposed at the end of the protrusion may be formed in the outer circumferential surface of the rod.

A guide pathway for guiding the moving member is formed in the guide member, wherein the guide pathway comprises: a locking pathway for guiding the moving member at the time of locking; and an unlocking pathway for guiding the moving member at the time of unlocking, and wherein the locking pathway and the unlocking pathway may be different.

A guide pathway for guiding the moving member is formed in the guide member, wherein the guide pathway comprises: a locking pathway for guiding the moving member at the time of locking; and an unlocking pathway for guiding the moving member at the time of unlocking, and wherein the locking pathway may be disposed at the upper portion or the lower portion of the unlocking pathway.

A guide pathway for guiding the moving member is formed in the guide member, wherein the guide pathway comprises: a locking pathway for guiding the moving member at the time of locking; and an unlocking pathway for guiding the moving member at the time of unlocking, and wherein the locking pathway may be disposed at the front direction or the rear direction of the unlocking pathway.

A protrusion guided by the guide member is formed in the moving member, and the protrusion may be rotatably installed in the moving member.

Advantageous Effects of Invention

According to the headrest moving device of the present invention as described above, the following effects can be obtained.

By comprising: a moving member rotatably connected to the second member; and a guide member connected to the first member and guiding the moving member and formed with the locking groove wherein the moving member is being stopped, thereby reducing the number of components significantly and the weight of the apparatus, and the manufacturing cost can be reduced, and the button becomes unnecessary therefore the structure of the apparatus becomes simplified, and the convenience of usage is enhanced since if a user presses one time, the headrest is positioned in a first position and if presses one more time in the same way the headrest is positioned in a second position.

The second member is provided with a first stopping portion on which the first portion of the guide member is stopped and a second stopping portion on which the second portion of the guide member is stopped, so that when the user moves to fold the headrest, it is possible to protect the apparatus by not moving the headrest excessively when the user moves to fold the headrest, and the second member is supported by the guide member when the headrest is in the upright state, so that the upright state is stably maintained and a separate structure for maintaining the upright state is not required, thereby simplifying the structure.

A moving member spring that returns the moving member is further provided so that the moving member is more stably guided by the guide member.

The second member is rotatable with respect to the first member; a rod inserting hole wherein a rod is inserted is formed in the guide member; a groove is formed in the guide member along the lengthwise direction of the rod so as to be disposed inside the rod inserting hole; and a protrusion being inserted into the groove is formed in the outer circumferential surface of the rod, so that the guide member is not moved along the front-to-rear direction with respect to the rod, thereby not requiring additional process such as welding.

In the outer circumferential surface of the rod, a flange disposed at the end of the protrusion is formed so that the left-to-right movement of the guide member with respect to the rod can be prevented by a simple process like pushing the protrusion towards the guide member after inserting the rod into the guide member.

A protrusion being guided by the guide member is formed in the moving member, and the protrusion is rotatably installed in the moving member so that the noise can be reduced by reducing the friction between the protrusion and the guide member.

BRIEF DESCRIPTION OF DRAWINGS

FIG. 1 is an exploded perspective view of a headrest folding device of the prior art.

FIG. 2 is a perspective view of a headrest moving device according to the first exemplary embodiment of the present invention.

FIG. 3 is an exploded perspective view of a headrest moving device according to the first exemplary embodiment of the present invention.

FIG. 4 is a perspective rear view of a headrest moving device according to the first exemplary embodiment of the present invention.

FIG. 5 is a cross-sectional view of a headrest moving device according to the first exemplary embodiment of the present invention.

FIG. 6 is a plan view of a headrest moving device according to the first exemplary embodiment of the present invention.

FIG. 7 is a view of operating steps illustrating the process of locking of a headrest moving device according to the first exemplary embodiment of the present invention.

FIG. 8 is a view of operating steps illustrating the process of unlocking of a headrest moving device according to the first exemplary embodiment of the present invention.

FIG. 9 is a cross-sectional view of a headrest moving device according to the second exemplary embodiment of the present invention (headrest upright position).

FIG. 10 is a cross-sectional view of a headrest moving device according to the second exemplary embodiment of the present invention (headrest folding position towards the rear).

FIG. 11 is a perspective view of a headrest moving device according to the third exemplary embodiment of the present invention.

FIG. 12 is a cross-sectional view of a headrest moving device according to the third exemplary embodiment of the present invention (headrest upright position).

FIG. 13 is a cross-sectional view of a headrest moving device according to the third exemplary embodiment of the present invention (headrest folding position).

FIG. 14 is a perspective rear view of a headrest moving device according to the fourth exemplary embodiment of the present invention.

FIG. 15 is a cross-sectional view of a headrest moving device according to the fourth exemplary embodiment of the present invention (headrest upright position).

FIG. 16 is a cross-sectional view of a headrest moving device according to the fourth exemplary embodiment of the present invention (headrest folding position).

MODE FOR THE INVENTION

Hereinafter, a preferred exemplary embodiment of the present invention will be described in detail with reference to the accompanying drawings as follows.

For reference, the components of the present invention which will be described hereinafter and are same as those of the prior art will not be described in detail separately, but instead, will be referred to the prior art described above.

When it is mentioned that one part is on the "top" of other part, this means that the part may be directly on the top of the other part or another different part may be associated with therebetween. In contrast, if it is mentioned that one part is "directly on the top" of the other part, no other part is interposed therebetween.

The terminology used is merely to refer to a particular embodiment and are not intended to limit the present invention. As used herein, the singular forms also include the plural form of text that does not indicate clearly the significance of the opposite. The meaning of "comprising" as used in the specification embodies a specific characteristic, region, integers, steps, operations, elements and/or components, however, it does not exclude the presence or addition of other specific characteristics, regions, integers, steps, operations, elements, components and/or groups.

"Lower," "down," "upper," "up," and the like are the terms representing a relative space, and they may be used to describe the relationship of one part with respect to the other part illustrated in the drawing easier. These terms are intended to include other meanings or operations of the device that is used with the meaning intended in the drawing. For example, if the device in the drawing is flipped, the part which was in the "lower" side of the other part is now in the "upper" side of the other part. Thus, the exemplary term "lower" includes all of the upper and lower directions. Device may be rotated 90°, or may be rotated at a different angle, and also the terms indicating the relative space are interpreted accordingly.

Hereinafter, the term "connection" includes both "direct connection" and "indirect connection."

Embodiment 1

As illustrated in FIGS. 2 to 8, a headrest moving device of the present exemplary embodiments is characterized in that and comprises: a first member 100; a second member 200 capable of rotating or sliding with respect to the first member 100; a return spring 300 for returning the second member 200 with respect to the first member 100; a moving member 400 rotatably connected to the second member 200; and a guide member 500 connected to the first member 100 for guiding the moving member 400 and formed with a locking groove 513 wherein the moving member 400 is stopped.

In the present exemplary embodiment, the first member 100 is a stay rod, and the second member 200 is a bracket. Unlike to this, the first member may be a bracket and the second member may be a stay rod.

The first member 100 is fixed along the front-to-rear direction with respect to the seat, and not being moved with respect to the seat. That is, the first member 100 is connected to the seat.

The second member 200 is fixed to the headrest H. That is, the second member 200 is connected to the headrest. Unlike to this, the first member may be connected to the headrest, and the second member may be connected to the seat.

The first member 100 comprises a vertical portion 110 disposed along the up-down direction, and a horizontal portion 120 connecting the both sides of the upper portion of the vertical portion 110 and disposed along the left-to-right direction.

The lower portion of the vertical portion 110 is inserted into the seat.

The horizontal portion 120 comprises a bended portion 121 integrally formed at the upper end of the horizontal portion 110 disposed at the one side thereof, and a rod 122 connecting the both sides of the bended portion 121.

The vertical portion 110 and the bended portion 121 are formed of a hollow pipe.

The rod 122 is disposed along the left-to-right direction.

At the both ends of the rod 122, a step portion 125 having a smaller outer diameter than the adjacent portion. The step portion 125 is inserted into the bended portion 121 and fixed through welding and the like.

The second member 200 comprises a left second member 210 disposed at the left side thereof and a right second member 220 disposed at the right side thereof.

The left second member 210 and the right second member 220 respectively comprise a first plate formed in the front side of the first plate by being bended towards the left or right along the front-to-rear direction and a second plate.

The first plate is disposed at the both sides of the device respectively, and the second plate is disposed at the front side of the device. The second plate of the left second member 210 and the right second member 220 is coupled to each other through welding and the like.

In the first plate of the second member 200, a rod through-hole 202 wherein the rod 122 of the first member 100 is penetrating through is penetratingly formed along the left-to-right direction. Due to this, the second member 200 is installed in the first member 100 so as to be rotated with respect to the first member 100. Therefore, the second member 200 is rotated centered around the rod 122 disposed along the left-to-right direction. The headrest H is folded towards the front with respect to the seat.

Unlike to the previous description, when a headrest moving device of the present invention is applied to a device moving along the front-to-rear direction with respect to the seat, the first member may be installed in the second member so as to be slided along the front-to-rear direction.

The return spring 300 that returns the second member 200 with respect to the first member 100 is provided with a coil spring and inserted into the rod 122. The return spring 300 applies an elastic force to the second member 200 along the clockwise direction when viewing from the right side.

The return spring 300 is disposed inside the second member 200.

In the first plate disposed at the left side, a return spring first stopping portion 203 wherein the one end of the return spring 300 is stopped is formed in the shape of a hole being penetrated along the left-to-right direction.

In the guide member 500 connected to the first member 100, a return spring second stopping portion 505 wherein the other end of the return spring 300 is stopped is formed in the shape of a slot.

The moving member 400 is formed in the shape of a plate disposed along the front-to-rear direction.

The moving member 400 is rotatably connected to the second member 200. The moving member 400 is rotatable with respect to the second member 200 in the clockwise or counterclockwise direction.

The moving member 400 is rotatably installed in the second member 200 through a moving member shaft 420 installed in the second member 200.

The both ends of the moving member shaft 420 are installed in the moving member shaft through-holes 204 and 205 formed in the first plate of the both sides. The moving member shaft through-holes 204 and 205 are disposed in the rear side further than the rod through-hole 202, and the center of the moving member shaft through-holes 204 and 205 is disposed at the upper side further than the center of the rod through-hole 202. The moving member shaft 420 is disposed along the left-to-right direction.

A head portion is formed at the one end of the moving member shaft 420, and a first, a second, and a third shaft diameter portions having a smaller outer diameter than the adjacent portion thereof are sequentially formed. The third shaft diameter portion is inserted into the moving member shaft through-hole 205. Due to such the first, the second, and the third shaft diameter portions, the member installed in the moving member shaft 420 is not being moved along the left-to-right direction.

In the one side of the moving member 400, a through-hole wherein the second shaft diameter portion is formed along the left-to-right direction.

In the other side of the moving member 400, a protrusion 410 is formed in a surface facing the guide member 500 so as to be facing towards the guide member 500. In the present exemplary embodiment, the protrusion 410 is protruded towards the left.

The protrusion 410 is a portion guided by the guide member 500, and is contacted with the guide member 500 when being guided.

The protrusion 410 is formed in the shape of a cylinder.

The protrusion 410 is rotatably installed in the moving member 400. Therefore, the friction between the guide member 500 and the protrusion 410 can be reduced.

In the upright position (unlocking), the protrusion 410 is separately disposed from the guide member 500.

Further, a moving member spring 430 that returns the moving member 400 is further provided.

The moving member spring 430 is provided as a coil spring.

The moving member spring 430 comprises a center portion in the shape of a coil, a center portion 431, and end portions 432 formed at the both ends of the center portion 431.

The center portion 431 is inserted into the first shaft diameter portion of the moving member shaft 420.

In the moving member 400 and the second member 200, a moving member spring second stopping portion 401 and a moving member spring first stopping portion 206 are formed respectively so that the moving member 400 and the second member 200 are disposed between the both end portions 432 of the moving member spring 430.

That is, the moving member spring 430 is disposed between the moving member spring second stopping portion 401 and the moving member spring first stopping portion 206. The moving member spring second stopping portion 401 is protrudedly formed towards the left at the one end of the moving member 400. Accordingly, the moving member shaft 420 is disposed between the moving member spring second stopping portion 401 and the protrusion 410. The moving member spring first stopping portion 206 is protrudedly formed towards the left in the rear lower portion of the first plate disposed at the right side thereof. The moving member spring first stopping portion 206 is disposed at the rear side of the moving member spring second stopping portion 401.

The moving member spring 430 is provided in such a way so that the moving member spring 430 applies an elastic force to the moving member 400 in the opposite direction of the rotational direction of the moving member 400 with respect to the second member 200.

Further, the moving member spring first stopping portion 206 is disposed at the rear lower portion than the moving member shaft through-hole 205. Therefore, the other end of the moving member 400 is inclinedly disposed so as to be further in the front upper side than the one side thereof when the locking is released. That is, the protrusion 410 of the moving member 400 is inclinedly disposed so as to face the locking pathway rather than to face the unlocking pathway.

Due to this, in a state of unlocking, when a user pushes the headrest H towards front direction, the moving member 400 can be smoothly guided to the locking pathway.

The guide member 500 is connected to the first member 100 and guides the moving member 400, and a locking groove 513 wherein the moving member 400 is stopped is formed.

Unlike to the previous description, the guide member may be integrally formed in the first member.

The guide member 500 is formed in the shape of a plate and disposed along the frontto-rear direction.

The guide member 500 is disposed at the right side of the return spring 300.

The guide member 500 is fixedly installed in the rod 122 of the first member 100.

A rod inserting hole 503 wherein the rod 122 is inserted is penetratingly formed along the left-to-right direction in the guide member 500.

In the guide member 500, a plurality of grooves 504 is penetratingly formed along the lengthwise (left-to-right) direction of the rod 122 so as to be disposed inside the rod inserting hole 503. The grooves 504 communicate with the rod inserting hole 503. A plurality of protrusions 123 being inserted into the grooves 504 is formed in the outer conferential surface of the rod 122. That is, a spline is formed on the outer circumferential surface of the rod 122. Thus, if the guide member 500 and the rod 122 are assembled in a way that the protrusions 123 are inserted into the grooves 504, the guide member 500 is not moved along the front-to-rear direction with respect to the rod 122 therefore any additional process such as welding becomes not necessary. Unlike to the previous description, the shape of the cross-section of the rod is formed in the shape of a polygonal (rectangular and the like) and the rod inserting hole is formed to correspond to the shape of the cross-section of the rod so that the guide member may not be rotated with respect to the rod.

The left-to-right length of the protrusions 123 is formed to be longer than the leftto-right width of the guide member 500.

In addition, a flange 124 is formed in the outer circumferential surface of the rod 122, and the flange 124 is disposed at the end of the protrusions 123. The flange 124 is disposed at the right end of the protrusions 123.

After the rod 122 is inserted into the rod inserting hole 503 of the guide member 500, if the protrusions 123 exposed towards the left side of the guide member 500 is pressed towards the guide member 500, the guide member 500 becomes immovable along the left-to-right direction with respect to the rod 122.

A first portion 501 and a second portion 502 are formed in the first member 100 or a member being fixed with respect to the first member 100; and a first stopping portion 201, wherein the first portion 501 is stopped, and a second portion 207, wherein the second portion 502 is stopped, are formed in the second member 200 or a member being fixed with respect to the second member 200, so that the headrest H is rotated within a certain angle.

At least one of the first portion 501 and the second portion 502 is formed in the guide member 500. In the present exemplary embodiment, all of the first portion 501 and the second portion 502 are integrally formed in the guide member 500.

At least one of the first stopping portion 201 and the second stopping portion 207 is formed in the second member 200. In the present exemplary embodiment, all of the first stopping portion 201 and the second stopping portion 207 are integrally formed in the second member 200.

The first portion 501 and the second portion 502 are disposed spaced apart along the up-down and the left-to-right directions. The second portion 502 is disposed further front upper side than the first portion 501.

When the second portion 502 is stopped at the second stopping portion 207, the headrest H is maintained in the upright state (0°, unlocked state).

When the headrest H is maximally rotated towards front, the first portion 501 is stopped at the first stopping portion 201. That is, when the portion 501 is stopped at the first stopping portion 201, the headrest H is in the maximum angle of tilt (75°).

The first portion 501 is downwardly and protrudedly formed in the lower portion of the guide member 500.

The first stopping portion 201 is rearwardly and protrudedly formed in the lower right end of the second plate of the second member 200.

The second portion 502 is formed in the front side of the guide member 500. The second portion 502 is the front surface of the guide member 500. In this way, when the headrest H is in the upright state, the headrest is supported by the front surface of the guide member 500, thereby enhancing the durability.

The second stopping portion 207 is the rear surface of the second plate of the second member 200. A shock absorbing member is disposed between the second portion 502 and the second stopping portion 207 so that the noise may not be generated when the locking is released.

A guide pathway 510 for guiding the protrusion 410 of the moving member 400 is formed in the guide member 500. The guide pathway 510 is formed through the outline of the guide member 500 and grooves formed in the right side surface of the guide member 500.

The guide pathway 510 is disposed in the upper side of the rod 122.

The guide pathway 510 is disposed further front than the protrusion 410 when the locking is released.

The guide pathway 510 comprises: a first pathway 511; a second pathway 512 disposed spaced apart at the front side of the first pathway 510; a locking groove 513 disposed spaced apart at the rear side of the second pathway 512; a third pathway 515 disposed spaced apart at the front lower side of the locking groove 513; and a fourth pathway 516 disposed at the rear upper side of the third pathway 515.

A guide pathway 510 is formed in a way that the protrusion 410 of the moving member 400 is moved via different pathways when the headrest H is rotated by the maximum rotation angle in the unlocked state and when the when the headrest H is rotated by the maximum rotation angle in the unlocked state.

The guide pathway 510 is formed in a way that the elastic force of the moving member spring 430 is applied to the protrusion 410 of the moving member 400 in the same direction until the headrest H is rotated by the maximum rotation angle in the unlocked state.

The first pathway 511 is curvedly formed in the shape of an arc so as to be disposed further front side as it travels towards the upper side.

The second pathway 512 is inclinedly formed so as to be disposed further rear side as it travels towards the lower side.

The locking groove 513 is continuously formed to the first pathway 511. The locking groove 513 is formed in a way that the front side and the right side thereof are open. The locking groove 513 is formed so as to be folded when the headrest H is rotated by 65°. The angle of the headrest H at the time of locking is less than the angle when the headrest H is maximally rotated. That is, when the headrest H is in the upright state at 0°, the folding angle of the headrest H is between 0° and the maximum rotation angle of the headrest.

The locking groove 513 is formed by the first surface and a second surface 514 disposed at the lower side of the first surface.

The first surface is disposed spaced apart from the second pathway 512 so as to be facing the second pathway 512. The first surface is inclinedly formed so as to be disposed at the further rear side as it travels towards the lower side.

The second surface 514 is continuously formed to the lower end of the first surface and inclinedly formed so as to be disposed at the further in the front side as it travels towards the lower side. Thus, the gap between the first surface and the second surface 514 is getting wider as it travels towards the front direction.

The third surface 515 is inclinedly formed so as to be disposed at the further rear side as it travels towards the lower side.

The fourth pathway 516 is continuously formed to the lower end of the second surface 514, and is curvedly formed so that the height is getting higher as it travels towards the rear direction.

The guide pathway 510 comprises: a locking pathway for guiding the moving member 400 at the time of locking; and an unlocking pathway for guiding the moving member 400 at the time of unlocking.

The locking groove 513 is formed in a way that it allows the protrusion 410 of the moving member 400 to enter through the locking pathway but does not allow it to flow out through the locking pathway, but not through the unlocking pathway.

The locking pathway comprises a first pathway 511 and a second pathway 512.

The unlocking pathway comprises a third pathway 515 and a fourth pathway 516.

In this way, the locking pathway and the unlocking pathway are different from each other. A locking groove 513 is disposed between the locking pathway and the unlocking pathway.

The locking pathway is formed to have a longer length than that of the unlocking pathway.

The locking pathway is disposed above or below the unlocking pathway. In the present exemplary embodiment, the locking pathway is disposed at the upper side of the unlocking pathway. Unlike to the above description, the locking pathway may be disposed on the left or right side of the unlocking pathway.

The protrusion 410 is disposed in the upper side than the unlocking pathway at the time of unlocking.

A guide pathway 510 is formed in this way, so that the moving pathway of the moving member 400 forms a closed curve at the time of locking and unlocking.

The guide pathway 510 is formed in a way that when an external force is applied for the first time to the first member 100 or the second member 200, the moving member 400 is stopped by the locking groove 513 and subsequently, when an external force is applied for the second time along the same direction as the first external force, the moving member 400 is separated from the locking groove 513. In the present exemplary embodiment, when the user pushed the upright headrest H along the counterclockwise direction, an external force is applied to the second member 200 for the first time so that the locking member is locked as the moving member 400 is stopped by the locking groove 513. Due to this action the headrest H is folded.

When the user pushes the headrest H towards the counterclockwise direction, an external force is applied to the second member 200 for the second time so that the protrusion 410 of the moving member 400 is separated from the locking groove 513. Due to this action, the headrest H is returned to the upright state by the return spring 300.

Hereinafter, the operation of the present exemplary embodiment having the above described configuration will be described.

In FIG. 7, the process of folding the upright headrest H towards the front direction is illustrated.

When the user pushes the headrest H forward until the first portion 501 is stopped by the first stopping portion 201 (maximum angle: 75°), the second member 200 and the moving member 400 are rotated forwards the front direction (rotated counterclockwise) with respect to the first member 100 and the guide member 500. The protrusion 410 of the moving member 400 is guided by the first pathway 511 so that the moving member 400 is rotated clockwise with respect to the second member 200. When the moving member 400 is rotated along the clockwise direction, the moving member spring 430 applies an elastic force along the counterclockwise direction to the moving member 400. The protrusion 410 is then guided by the second pathway 512.

Also, when the protrusion 410 is guided by the second pathway 512, the moving member 400 is subjected to a counterclockwise elastic force. As described above, until the user rotates the headrest H at the maximum angle, the moving member 400 is continuously subjected to the elastic force in the same direction.

Thereafter, when the pushing force (first external force) of the headrest H is removed, the second member 200 and the moving member 400 are slightly rotated towards the rear direction with respect to the first member 100 and the guide member 300 by the elastic force of the return spring 300, and after being guided by the second surface 514, the protrusion 410 is stopped by the locking groove 513. Due to this action, the headrest H is maintained at an angle rotated by 65° counterclockwise. That is, if the user releases the headrest H after rotating it along the forward direction until the headrest H is no longer rotated, the headrest H is locked after being slightly rotated towards the rear direction.

In FIG. 8, the process of erecting the folded headrest H in an upright position is illustrated.

When the user pushes the headrest H along the front direction until the first portion 501 is stopped by the first stopping portion 201 (maximum angle: 75°), the second member 200 and the moving member 400 are rotated along the front direction (counterclockwise direction) with respect to the first member 100 and the guide member 500. That is, the headrest moving device of the present exemplary embodiment has the same maximum rotation angle of the headrest H at the time of locking and at the time of unlocking. The protrusion 410 of the moving member 400 is guided by the third pathway 515 after being separated from the locking groove 513. An elastic force is applied to the moving member 400 along the counterclockwise direction until the moving member 400 is guided to the third pathway 515. When the protrusion 410 is inserted into the locking groove 513 and when the protrusion 410 is separated, the elastic force is applied to the moving member 400 in the same direction.

Thereafter, when the pushing force (second external force) of the headrest H is removed, the second member 200 and the moving member 400 are moved along the rear direction (clockwise direction) with respect to the first member 100 and the guide member 500 by the elastic force of the return spring 300, and thereby the protrusion 410 is guided by the fourth pathway 516. The protrusion 410 is guided by the fourth pathway 516 and is rotated counterclockwise. Therefore, the elastic force in the clockwise direction is applied to the moving member 400 by the moving member spring 430, and the protrusion 410 is moved in a state of being in close contact with the fourth pathway 516. Subsequently, as the second member 200 and the moving member 400 are rotated clockwise the protrusion 410 exits the fourth pathway 516, and thereby the moving member 400 is returned to the original position by the moving member spring 430.

At the time of unlocking, the moving member 400 is guided by the guide member 500.

In this way, according to the headrest moving device of the present invention, the user can easily fold or erect the headrest easily by pressing the headrest H in the same direction when folding (locking) and erecting (unlocking) the headrest. Further, even if the user rotates at an angle larger than the locking angle when locking, the locked state is not released to the unlocked state, and thus, the user's convenience is enhanced. Further, the structure of the device becomes simple, the manufacturing process is simplified, the total weight is reduced, and the device can be kept compact.

Embodiment 2

In describing the headrest moving device according to the second exemplary embodiment of the present invention, same symbols will be used for the same or similar elements as those of the headrest moving device according to the previous exemplary embodiment of the present invention, and the detailed description and illustration will be omitted.

As illustrated in FIGS. 9 and 10, the headrest moving device according to the second exemplary embodiment is locked as a moving member 400 is inserted into a locking groove 513 of a guide member 500' when the headrest is in an upright state, and the guide member 500' is installed in a first member 100 in a way that the moving member 400 is separated from the locking groove 513 when the headrest is in a folded state.

The elastic force of the return spring is applied clockwise to a second member 200 wherein the moving member 400 is rotatably mounted.

A first portion 501' in which a first stopping portion 201 is stopped is disposed at the front lower portion than a second portion 502' in which a second stopping portion 207 is stopped. Specifically, the second portion 502' is inclinedly formed so that the height is getting higher as it travels towards the rear direction.

Further, the locking pathway formed in the guide member 500' is disposed at the rear direction of the unlocking pathway. The shape of the guide pathway formed in the guide member 500' is the same as that in the previous embodiment, and the guide member 500' is fixed to the first member 100 with the guide member 500' rotated clockwise by a predetermined angle. The predetermined angle is an angle at which the headrest is folded towards the rear direction.

The process of folding the erected headrest towards the rear direction is as follows.

When the user pushes the headrest forward until the first stopping part 201 is stopped by the first portion 501', the moving member 400 is separated from the locking groove 513. Thereafter, when the user removes the pushing force, the second member 200 and the moving member 400 are rotated clockwise by the elastic force of the return spring. After the moving member 400 is moved to the unlocking pathway, the moving member 400 is returned to the original position by the moving member spring. The second stopping portion 207 of the second member 200 being rotated in the clockwise direction is stopped by the second portion 502', and thereby the rearwardly folded state of the headrest is maintained.

The process of erecting the folded headrest is as follows.

When the user pushes the headrest forward until the first stopping part 201 is stopped by the first portion 501', the moving member 400 is moved towards the locking pathway. Subsequently, when the user removes the pushing force the second member 200 and the moving member 400 are rotated along the clockwise direction by the elastic force of the return spring, and the moving member 400 is inserted into the locking groove 513, and thereby the upright state of the headrest is maintained.

Embodiment 3

In describing the headrest moving device according to the third exemplary embodiment of the present invention, same symbols will be used for the same or similar elements as those of the headrest moving device according to the previous exemplary embodiments of the present invention, and the detailed description and illustration will be omitted.

As illustrated in FIGS. 12 to 14, a first member 100' of the headrest moving device according to the third exemplary embodiment of the present invention is connected to the headrest, and a second member 200' is connected to the seat.

The headrest is provided on the upper side of a vertical portion 110 of the first member 100'. A horizontal portion 120 is disposed at the lower side of the vertical portion 110. A guide member 500" is provided on the horizontal portion 120. A first portion 501" of the guide member 500" is disposed at the rear upper of the second portion 502". A guide pathway formed in the guide member 500" at the unlocking (upright) position is disposed at the lower front side than the center of the horizontal portion 120. The locking pathway formed in the guide member 500" is disposed at the lower side of the unlocking pathway.

A fixing bracket 208 is outwardly formed bended at the rear ends of the left and right second members of a second member 200'. The fixing bracket 208 is fixedly installed to a frame or the like of the seat.

A second member 200' is disposed inside the seat.

A first stopping portion 201' of the second member 200' is disposed at the upper side of the second stopping portion 207'.

A moving member 400' is rotatably installed in the second member 200' in a way that the portion that is stopped by the guide member 500" is disposed further at the front lower side than the portion connected to the second member 200' at the time of unlocking (upright).

The portion connected to the second member 200' from the moving member 400' is disposed at the lower rear side than the center of the horizontal portion 120 at the time of unlocking (upright).

The process of folding the upright headrest towards the front direction is as follows.

When the user pushes the headrest forward until the first portion 501" is stopped by the first stopping portion 201', the first member 100' and the guide member 500" are rotated counterclockwise. The protrusion of the moving member 400' is guided along the locking pathway. When the pushing force of the user is removed, the first member 100' and the guide member 500" are rotated clockwise by the return spring so that the protrusion of the moving member 400' is inserted into a locking groove 513". Therefore, the headrest is kept folded forward.

The process of erecting the folded headrest is as follows.

When the user pushes the headrest forward until the first portion 501" stopped by the first stopping portion 201', the first member 100' and the guide member 500" are rotated counterclockwise and the protrusion of the moving member 400' is separated from the locking groove 513". When the pushing force of the user is removed, the first member 100' and the guide member 500" are rotated clockwise by the return spring so that the protrusion of the moving member 400' is guided along the unlocking pathway. The second portion 502" is stopped by the second stopping portion 207' so that the headrest remains in an upright state.

Embodiment 4

In describing the headrest moving device according to the fourth exemplary embodiment of the present invention, same symbols will be used for the same or similar elements as those of the headrest moving device according to the previous exemplary embodiments of the present invention, and the detailed description and illustration will be omitted.

As illustrated in FIGS. 15 to 16, a first member 100a of the headrest moving device according to the fourth exemplary embodiment of the present invention has the shape of a bracket, and a second member 200a has the shape of a stay rod.

The first member 100a is fixed to the headrest.

The second member 200a is fixed along the front-to-rear direction with respect to the seat.

The first member 100a includes a left second member 130 disposed at the left side and a right second member 140 disposed at the right side.

The left second member 130 and the right second member 140 of the first member 100a respectively comprises: a first plate disposed along the front-to-rear direction; and a second plate that are formed bended towards the left or right side, and are disposed along the left-to-right direction. The first plate is disposed at each side of the device, and the second plate is disposed in front of the device. The left second member 130 and the second plate of the right second member 140 are joined to each other through welding or the like.

In the first plate of the first member 100a, a rod through-hole, wherein a rod, which will be described later, of the second member 200a is penetrating through, is penetratingly formed along the left-to-right direction. As a result, the first member 100a is installed in the second member 200a so as to be rotatable with respect to the second member 200a. Therefore, the first member 100a is rotated around the rod disposed along the left-to-right direction. The headrest H of the present exemplary embodiment is folded forward with respect to the seat.

In this way, the first member 100a is formed in the same shape as the second member in the first exemplary embodiment. Therefore, a further detailed description thereof will be omitted.

The second member 200a comprises: a vertical portion 230 disposed along the up-down direction; and a horizontal portion 240 connected to both sides of the vertical portion 230 and disposed along the left-to-right direction.

The lower side of the vertical portion 230 is inserted into the seat. The vertical portion 230 may be installed in the seat so as to be movable along the up-down direction.

The horizontal portion 240 comprises: a bended portion integrally formed at the upper end of the vertical portion 230 disposed at one side; and a rod connecting the bended portions at both sides.

The vertical portion 230 and the bended portion are formed as hollow pipes.

The rod is disposed along the left-to-right direction.

In this way, the second member 200a is formed in the same shape as the first member in the first exemplary embodiment. Therefore, a further detailed description thereof will be omitted.

A return spring 300 that returns the first member 100a with respect to the second member 200a is provided with a coil spring and is inserted into the rod. The return spring 300 applies an elastic force to the first member 100a in a clockwise direction when viewed from the right side.

The return spring 300 is disposed inside the first member 100a.

In a first plate disposed at the left side of the first member 100a, a return spring first stopping portion wherein the one end of the return spring 300 is stopped is formed in the shape of a hole being penetrated along the left-to-right direction.

In a connecting member 250 connected to the first member 100a is formed with a return spring second stopping portion wherein the other end of the return spring 300 is stopped.

A moving member 400a is formed in the shape of a plate disposed along the frontto-rear direction.

The one side of the moving member 400a is rotatably formed in the second member 200a. The moving member 400a is rotatable along the clockwise or counterclockwise direction with respect to the second member 200a.

The moving member 400a is indirectly connected to the second member 200a through the connecting member 250. The connecting member 250 is formed in the shape of a plate disposed along the front-to-rear direction. The connecting member 250 is fixedly installed in the rod of the second member 200a. A spline is formed in the rod, and the connecting member 250 is fixedly installed in the rod in the same manner as the guide member is fixed to the rod of the first member in the first exemplary embodiment. Therefore, the detailed description thereof will be omitted. In the present exemplary embodiment, although it is described with an example wherein the second member 200a and the connecting member 250 are separately formed, the second member and the connecting member may be integrally formed.

The moving member 400a is disposed between the first plate disposed at the right side of the first member 110a and the connecting member 250.

The moving member 400a is rotatably installed in the connecting member 250 through a moving member shaft provided in the connecting member 250. The left end of the moving member shaft is installed in a moving member shaft through-hole formed in the connecting member 250. The center of the shaft through-hole is disposed at the further front upper side than the center of rod through-hole. The moving member shaft is disposed along the left-to-right direction.

On the other side of the moving member 400a, a protrusion protruding toward the guide member 500a is formed on a surface facing the guide member 500a. In the present exemplary embodiment, the protrusion is projected towards the right side.

When the headrest is erected (unlocking), the protrusion is disposed so as to be separated from the guide member 500a.

Further, a moving member spring 430a for returning of the moving member 400a is further provided.

The moving member spring 430a is provided as a coil spring.

The moving member spring 430a comprises: a center portion in the shape of a coil; and end portions formed at the both ends of the center portion.

The center portion of the moving member spring 430a is inserted into the moving member shaft.

A moving member spring second stopping portion and a moving member spring first stopping portion are respectively formed in the moving member 400a and the connecting member 250 in a way that the moving member 400a and the connecting member 250 fixed to the second member 200 are disposed between both ends of the moving member spring 430a. That is, the moving member spring moving member spring first stopping portion is disposed between the moving member spring second stopping portion and the moving member spring first stopping portion. The moving member spring second stopping portion is formed at the one end of the moving member 400a protruded towards the right side. The moving member first stopping portion is protrudedly formed towards the right side in the front lower side of the moving member 250. At the time of upright position, the moving member spring first stopping portion is disposed in the front lower side of the moving member spring second stopping portion.

The moving member spring 430a is thus provided such that the moving member spring 430a applies an elastic force to the moving member 400a in the direction opposite to the direction in which the moving member 400a is rotated with respect to the second member 200a.

Further, the moving member spring first stopping portion 206 is disposed further front lower side than the moving member shaft through-hole 205. Therefore, at the time of unlocking, it is inclinedly disposed in a way that the other side of the moving member 400a is disposed further in the rear upper side than the one side thereof. As a result, when the user pushes the headrest H towards the front direction at the time of unlocking, the moving member 400a can be guided smoothly towards the locking pathway.

The guide member 500a is connected to the first member 100 and guides the moving member 400a and a locking groove 513a wherein the moving member 400a is stopped is formed therein.

Unlike to the previous description, the guide member may be integrally formed in the first member.

The guide member 500a is formed in the shape of a plate and disposed along the front-to-rear direction.

At the time of upright position, the moving member 500a is disposed further in the rear direction than the moving member 400a and the connecting member 250.

The moving member 500a is fixedly installed in the first plate disposed at the right side of the first member 100a.

In the first member 100a, a first stopping portion 101 to which a first portion 251 of the connecting member 250 fixed to the first member 100a is stopped, and a second stopping portion 102 to which a second portion 252 of the connecting member 250 is stopped are formed, and thereby the headrest H is rotated within a certain range of angles.

The first portion 251 and the second portion 252 are disposed spaced apart from each other along the up-down and front-to-rear directions. The second portion 252 is disposed further front upper side than the first portion 251.

When the second portion 252 is stopped by the second stopping portion 102, the headrest H is maintained in the upright state (0°, unlocked state).

The first portion 251 is stopped by the first stopping portion 101 when the headrest H is rotated maximally towards the front direction. That is, when the first stopping portion 101 is stopped by the first portion 251, the angle of the headrest H becomes the maximum (75°).

The first portion 251 is protrudedly formed towards the lower side in the lower side of the connecting member 250.

The first stopping portion 101 is protrudedly formed towards the rear side in the right lower end of the second plate of the first member 100a.

The second portion 252 is formed in front of the connecting member 250. The second portion 252 is the front surface of the connecting member 250. In the upright state, the durability of the headrest H is enhanced by supporting the headrest H with the front surface of the connecting member 250.

The second stopping portion 102 is the rear surface of the second plate of the first member 100a.

A guide pathway 510a that guides the protrusion of the moving member 400a is formed in the guide member 500a. The guide pathway 510a is formed through the outline of the guide member 500a and the groove formed in the left side surface of the guide member 500a.

The guide pathway 510a is disposed at the upper side of the rod.

The guide pathway 510a is disposed at the further rear side than the protrusion at the time of unlocking.

The guide pathway 510a comprised a locking pathway for guiding the moving member 400a at the time of locking, and an unlocking pathway for guiding the moving member 400a at the time of unlocking.

The locking pathway is disposed at the upper side of the unlocking pathway.

In the present exemplary embodiment, when the user pushes the upright headrest counterclockwise, an external force is applied to the first member 100a for the first time, and the moving member 400a is stopped by the locking groove 513a so as to be locked. Due to this, the headrest is folded.

When the user pushes the folded headrest counterclockwise, an external force is applied to the first member 100a for the second time, and the moving member 400a is separated from the locking groove 513a. Due to this, the headrest H is returned to the upright position by the return spring 300.

The process of folding the upright headrest towards the front direction is as follows.

When the user pushes the headrest forward until the first stopping portion 101 is stopped by the first portion 251, the first member 100a and the guide member 500a are rotated counterclockwise. The protrusion of the moving member 400a is guided along the locking pathway. When the pushing force of the user is removed, the first member 100a and the guide member 500a are rotated clockwise by the return spring 300 so that the protrusion of the moving member 400a is inserted into the locking groove 513a. Therefore, the headrest is kept folded forward.

The process of erecting the folded headrest is as follows.

When the user pushes the headrest forward until the first stopping portion 101 is stopped by the first portion 251, the first member 100a and the guide member 500a are rotated counterclockwise so that the protrusion of the moving member 400a is separated from the locking groove 513a. When the pushing force of the user is removed, the first member 100a and the guide member 500a are rotated clockwise by the return spring 300 so that the protrusion of the moving member 400a is guided along the unlocking pathway. The second stopping portion 102 is stopped by the second portion 252 so that the upright state of the headrest is maintained.

Unlike to the previous description, the first member in the shape of a bracket may be fixed to the seat, and the second member in the shape of a stay rod may be fixedly installed along the front-to-rear direction with respect to the headrest in the front-rear direction. In this case, the guide member is disposed at the rear side of the moving member. Further, the locking pathway formed in the guide member is disposed at the upper side of the unlocking pathway. And the protrusion of the moving member is disposed at the rear lower portion than the moving member shaft at the time of unlocking. The moving member is disposed at a lower front side than the rod of the second member at the time of unlocking, and the guide member is disposed at a lower rear side than the rod.

As described above, although the present invention has been described with reference to the first exemplary embodiment, various changes and alterations of the present invention can be made by those skilled in the art without departing from the spirit and the scope of the present invention written in the claims described herein below.

DESCRIPTION OF SYMBOLS

Description of Numerals for Major Elements in Drawings

100: first member, 110: vertical portion
120: horizontal portion, 121: bended portion
122: rod, 123: protrusion
124: flange, 125: step portion
200: second member, 201: first stopping portion
202: rod through-hole, 203: return spring first stopping portion
204, 205: moving member shaft through-hole
206: moving member spring first stopping portion
207: second stopping portion, 210: left second member
220: right second member, 300: return spring
400: moving member, 401: moving member spring second stopping portion
410: protrusion, 420: moving member shaft
430: moving member spring, 431: center portion
432: both ends, 500: guide member
501: first portion, 502: second portion
503: rod-in hole, 504: groove
505: return spring second stopping portion, 510: guide pathway
511: first pathway, 512: second pathway
513: locking groove, 514: third pathway
515: fourth pathway, 516: fifth pathway

The invention claimed is:

1. A headrest moving device comprising:
a first member;
a second member capable of rotating or sliding with respect to the first member;
a return spring for returning the second member with respect to the first member;
a moving member rotatably connected to the second member; and
a guide member connected to the first member for guiding the moving member and formed with a locking groove wherein the moving member is stopped,
wherein a protrusion guided by the guide member is formed in the moving member, and the protrusion is rotatably installed in the moving member.

2. The headrest moving device according to claim 1, wherein the pathway of the moving member has the shape of a closed curve.

3. The headrest moving device according to claim 1, wherein a moving member spring for returning the moving member is further provided.

4. The headrest moving device according to claim 3, wherein the moving member and the second member are disposed between the both ends of the moving member spring.

5. The headrest moving device according to claim 3, wherein the moving member spring applies an elastic force along the direction opposite to the direction along which the moving member is rotating with respect to the second member.

6. The headrest moving device according to claim 1, wherein the second member can be rotated with respect to the first member, a rod inserting hole wherein a rod is inserted is formed in the guide member, a groove is formed in the guide member so as to be disposed inside the rod inserting hole along the lengthwise direction of the rod, and a protrusion to be inserted into the groove is formed in the outer circumferential surface of the rod.

7. The headrest moving device according to claim 5, wherein a flange disposed at the end of the protrusion is formed in the outer circumferential surface of the rod.

8. The headrest moving device according to claim 1, wherein a guide pathway for guiding the moving member is formed in the guide member, wherein the guide pathway comprises:
- a locking pathway for guiding the moving member at the time of locking; and
- an unlocking pathway for guiding the moving member at the time of unlocking, and wherein the locking pathway and the unlocking pathway are different.

9. The headrest moving device according to claim 1, wherein a guide pathway for guiding the moving member is formed in the guide member, wherein the guide pathway comprises:
- a locking pathway for guiding the moving member at the time of locking; and
- an unlocking pathway for guiding the moving member at the time of unlocking.

10. The headrest moving device according to claim 1, wherein a guide pathway for guiding the moving member is formed in the guide member, wherein the guide pathway comprises:
- a locking pathway for guiding the moving member at the time of locking; and
- an unlocking pathway for guiding the moving member at the time of unlocking.

* * * * *